United States Patent [19]

Foschini et al.

[11] Patent Number: 4,703,474
[45] Date of Patent: Oct. 27, 1987

[54] SPREAD SPECTRUM CODE-DIVISION-MULTIPLE-ACCESS (SS-CDMA) LIGHTWAVE COMMUNICATION SYSTEM

[75] Inventors: Gerard J. Foschini, Sayreville; Giovanni Vannucci, Middletown, both of N.J.

[73] Assignee: American Telephone and Telegraph Company, AT&T Bell Laboratories, Murray Hill, N.J.

[21] Appl. No.: 834,346

[22] Filed: Feb. 28, 1986

[51] Int. Cl.[4] .......................... H04B 9/00; H04J 13/00
[52] U.S. Cl. .......................................... 370/18; 370/3; 375/1; 455/611; 455/617
[58] Field of Search .......................... 370/18, 19, 76, 3; 455/608, 617, 618, 611, 607; 375/1; 332/7.51

[56] References Cited

U.S. PATENT DOCUMENTS

| | | | |
|---|---|---|---|
| 3,605,018 | 9/1971 | Coviello | 325/65 |
| 4,112,372 | 9/1978 | Holmes et al. | 325/321 |
| 4,164,628 | 8/1979 | Ward et al. | 179/15 BA |
| 4,209,689 | 6/1980 | Linford et al. | 455/609 |
| 4,285,060 | 8/1981 | Cobb et al. | 375/1 |
| 4,335,463 | 6/1982 | Foucard | 375/1 |
| 4,423,517 | 12/1983 | Danno et al. | 375/1 |
| 4,460,992 | 7/1984 | Gutleber | 370/19 |
| 4,467,468 | 8/1984 | Miller | 370/3 |
| 4,470,138 | 9/1984 | Gutleber | 370/18 |

FOREIGN PATENT DOCUMENTS

2125654 3/1984 United Kingdom .................. 370/18

OTHER PUBLICATIONS

Fox, Optical and Acoustical Micro-Electronics, Polytechnic Press, Brooklyn, New York, Apr. 1974, pp. 67–93.
Guilfoyle et al., 1978 Intl. Opt. Computing Conf., London, England, Sep. 1978, pp. 86–89.
Laber et al., IEEE Trans. Aerosp & Electron. Sys. vol. AES-16, No. 4, Jul. 1980, pp. 440–445.
Davies et al., Electronic Let., 12 May 1983, vol. 19, No. 10, pp. 390–392.
Pfeiffer et al., Proc. SPIE, Fiber Optics in Local Area Networks, vol. 434, Husbands, Editor, Aug. 25, 1983, San Diego, Calif., pp. 20–23.
Hasegawa et al., NEC Res. & Develop., No. 71, Oct. 1983, pp. 48–57.
Shaar et al., Electronics Let., vol. 19, No. 21, Oct. 13, 1983, pp. 880–890.
Spacklen et al., 8th Intl. Fiber Opt. Comm. & LAN Expo., Las Vegas, Nev., Sep. 1984, pp. 70–74.

Primary Examiner—Joseph A. Orsino, Jr.
Attorney, Agent, or Firm—Erwin W. Pfeifle

[57] ABSTRACT

The present invention relates to a lightwave communication system, and associated transmitters (13) and receivers (14), which uses both spread spectrum, code-division-multiple-access (SS-CDMA), and wavelength-division-multiplexing (WDM) techniques for 2-way transmissions over a lightwave waveguide arrangement (11) to use the overall spectrum of the waveguide arrangement (11) while providing sufficient interference rejection of randomly spaced carriers, and associated signals, which may drift into the bandwidth of transmissions of other transmitter/receiver pairs due to instabilities in carrier laser sources (20). Techniques are also disclosed for a transceiver $(10_i)$ acquiring a 2-way link with another transceiver $(10_j)$, while other transmitter/receiver pairs are concurrently communicating using WDM, SS-CDMA, signal transmissions. For example, a calling transceiver transmits a narrowband information message (40) on a random carrier which is detected by a called transceiver by scanning the frequency spectrum. The called transceiver then returns a narrowband answer signal (41) on another random carrier which is detected by the calling transceiver. In this manner, each transceiver locks onto the carrier of the other transceiver and the appropriate pseudo-noise (PN) code sequence can then be determined and synchronized before WDM, SS-CDMA, 2-way transmissions begin.

15 Claims, 4 Drawing Figures

SPREAD SPECTRUM CODE-DIVISION-MULTIPLE-ACCESS (SS-CDMA) LIGHTWAVE COMMUNICATION SYSTEM

TECHNICAL FIELD

The present invention relates to a spread spectrum code-division-multiple-access (SS-CDMA) lightwave communication system. More particularly, in the present system, spread spectrum techniques are used to implement a CDMA scheme on, for example, a single-mode optical waveguide arrangement wherein the transmission bandwidths of the various users do not necessarily coincide but are randomly scattered over the enormous channel bandwidth of the waveguide arrangement.

DESCRIPTION OF THE PRIOR ART

The use of optical fibers in communications systems is increasing from year to year. The multiple access, link length variation, etc. nature of such optical fiber systems places certain requirements on signaling and detection schemes to insure that a satisfactory predetermined error rate is achieved under varied conditions at the receivers. To achieve satisfactory separation in multiple concurrent transmissions on a fiber optic system, various modulation or multiplexing techniques have been employed which are at times similar to techniques found in microwave systems.

Spread spectrum modulation techniques have been used in terrestrial and satellite microwave communication systems to achieve security and satisfactory interference rejection at the receivers. In this regard see, for example, U.S. Pat. Nos. 4,112,372 issued to J. D. Holmes et al. on Sept. 5, 1978; 4,164,628 issued to C. R. Ward et al. on Aug. 14, 1979; and 4,470,138 issued to F. S. Gutleber on Sept. 4, 1984. More recently, spread spectrum modulation techniques have been suggested for use in optical communication systems. In this regard see, for example, the articles "Spread-Spectrum Signaling For Distributed Fiber Optical Systems" by C. A. Laber et al. in IEEE *Transactions of Aerospace and Electronic Systems*, Vol. AES-16, No. 4, July 1980, at pages 440-445; and "Spread-Spectrum Multiple Access Data Loop" by S. Hasegawa et al. in NEC *Research & Development*, No. 71, October 1983, at pages 48-57.

Optical single-mode fibers have a bandwidth that is measured in tens of THz (1 THz=1000 GHz). However, even the fastest optical fiber system of today leaves this large bandwidth mostly untapped, as the maximum bit rate in such a fiber system is measured in Gbit/sec. Among the various obstacles in the way of achieving efficient bandwidth utilization through Wavelength-Division-Multiplexing WDM), an important one is the lack of stability of semiconductor laser. A typical laser frequency will vary as a result of temperature variations, aging, and other causes in the order of several hundred Gigahertz. Therefore, in a Wavelength-Division-Multiplexing (WDM), also known as a Frequency-Division-Multiplexing (FDM), system, one must allow for a separation of several hundred GHz between adjacent channels to avoid possible interference due to one carrier drifting into the band used by an adjacent signal. This results in highly inefficient usage of the available fiber bandwidth, particularly in the case where each user only requires a small bandwidth. As a result, WDM is highly inefficient in the situations typical of local-area networks, where there may be hundreds or even thousands of users, each user requiring a relatively low bit rate.

The problem remaining in the prior art is to provide an optical communication system which uses the bandwidth of an optical waveguide arrangement, such as a single-mode optical fiber, in a substantially more efficient manner.

SUMMARY OF THE INVENTION

The foregoing problem in the prior art is solved in accordance with the present invention which relates to a technique for transmitting a spread spectrum code-division-multiple-access, (SS-CDMA) in a lightwave communication system and a transmitter and receiver designed to operate in such a system. More particularly, a lightwave communication technique and system, and an associated transmitter and receiver design, is disclosed wherein spread spectrum and CDMA techniques are used in addition to random Wavelength-Division-Multiplexing (WDM) in, for example, a single-mode optical waveguide arrangement, such that the transmission bandwidths of the various users, and their associated transceivers, do not necessarily coincide but are randomly scattered over the enormous channel bandwidth of the lightwave tranmission medium of the system to reduce interference and efficiently use the lightguide spectrum.

It is an aspect of the present invention to provide a WDM, SS-CDMA, lightwave communication system which permits receivers therein to track the drift of the carrier frequency of a signal it is receiving, and maintain good reception, even if the carrier frequency drifts into the bandwidth used by another transmitter/receiver pair. It is a further aspect of the present invention to provide a spread-spectrum lightwave communication system wherein the spectrum of the underlying electromagnetic field is spread and de-spread, as opposed to the spreading and de-spreading of the spectrum of just the light-intensity signal.

Other and further aspects of the present invention will become apparent during the course of the following description and by reference to the accompanying drawings.

BRIEF DESCRIPTION OF THE DRAWINGS

Referring now to the drawings.

DETAILED DESCRIPTION

In accordance with the present invention, a lightwave communication system uses spread spectrum code-division-multiple-access (SS-CDMA) techniques along with wavelength-division-multiplexing (WDM), otherwise known as Frequency-Division-Multiplexing (FDM), to achieve a lightwave communication system which efficiently uses the available optical spectrum of the associated lightguide while providing adequate rejection of interference caused by one signal drifting into the bandwidth being used by another transmitter/receiver pair. The present invention can be used to implement, for example, a local area network capable of supporting thousands of simultaneous two-way communication channels at a relatively low data rate, e.g., 10 Mbit/sec each, with no blocking, no hierarchy, and no centralized control. Also, since the communication channels are supported in a time-parallel manner, extraordinary throughput can be achieved without requiring unreasonable hardware speed. The present network architecture can, therefore, also be used to realize a switching system capable of establishing thousands, or even tens of thousands, of high-data-rate (e.g., 10 Mbit/sec) interconnections.

Figure 1:
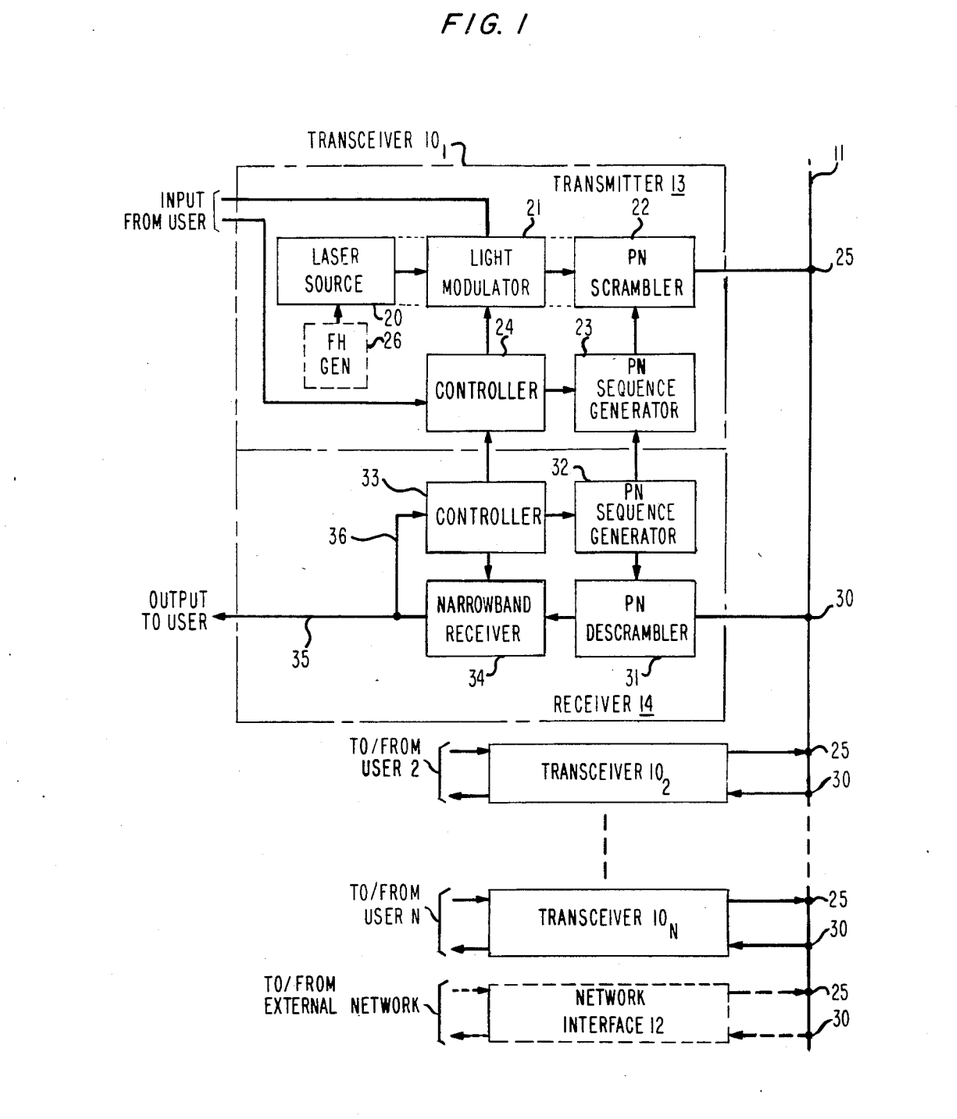
FIG. 1 is a block diagram of a WDM, SS-CDMA, lightwave communication system arrangement including an exemplary transceiver arrangement in accordance with the present invention.

FIG. 1 is a block diagram of a preferred embodiment of the present optical communication system including an examplary transceiver arrangement in accordance with the present invention, showing all possible elements even though certain elements can be combined or are optional. In FIG. 1, a plurality of N optical transceivers $10_1$ to $10_N$ are coupled to an optical waveguide arrangement 11, to permit communications between pairs of the transceivers $10_i$, or between a transceiver and an external network via an optional network interface unti 12 where such inter-network communication is desired. Optical wavegide arrangement 11 can be any optical device that combines the light signals from all the transmitters 13 of transceivers $10_1$ to $10_N$, and network interface 12 if present, and distributes the resulting superposition of signals among all receivers 14 of the N transceivers, and network interface 12, if present. In a preferred embodiment of the system, the optical waveguide arrangement 11 might consist of a large star coupler, with an input fiber from each transmitter 13, and network interface 12 if present, and an output fiber to each receiver 14, and network interface 12 if present. Alternative implementations might be as an optical bus or loop or any arrangement of optical devices that achieves the same function.

Each transceiver $10_i$ comprises a transmitter 13, for transmitting a signal from an associated system user over optical waveguide arrangement 11, and a receiver 14 which receives all WDM, SS-CDMA, signals propagating on optical waveguide arrangement 11 and de-spreads the desired WDM, SS-CDMA signal for delivery to the associated system user.

An exemplary transmitter 13 in each of transceivers $10_i$ is shown in FIG. 1 as comprising a laser source 20 which has its signal modulated by a light modulating means 21 internally or externally to source 20. Laser source 20 can be implemented by, for example, a semiconductor laser or any other suitable light source which is a coherent system that acts like an oscillator for generating a random carrier frequency. The lightwave signal of laser source 20 is modulated by modulating means 21 using any one of a variety of methods well-known in the art, including direct modulation of the laser current or external amplitude or phase modulation of the light. The modulating signal is either a digital or an analog signal from the associated system user. This results in an modulated output signal destined for another system user or to an external network, when network interface 12 is present in the system. The modulated output signal from the directly or externally modulated laser source 20 is, therefore, an up-converted signal in a frequency band determined by laser source 20 which is shown in FIG. 1 as being delivered to a spectrum spreading device 22 which for purposes hereinafter will be considered as a Pseudo-Noise (PN) scrambling means 22.

Figure 2:
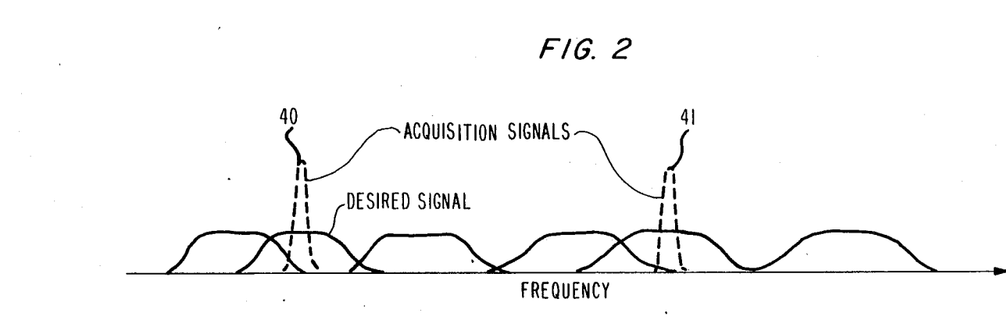
FIG. 2 illustrates a plurality of exemplary WDM, SS-CDMA, signal spectra disposed relative to the overall spectrum of a received signal before de-spreading of the desired signal at a receiver.

In PN scrambling means 22, a predetermined high-frequency pseudo-random noise code, generated by a PN sequence generator 23 under the control of a controller 24, further modulates the modulated information wave from the laser source 20/light modulator 21 combination to produce an output signal that is spread over a greater bandwidth than the information wave from modulated laser source 20, using any well known spreading technique. The output signal from PN scrambling means 22 is coupled into optical waveguide arrangement 11 via any well-known optical coupling device. It is to be understood that the sequence of laser source 20, light modulating means 21 and PN scrambling means 22, as shown in FIG. 1, could be modified such that the light signal from the laser source could have its spectrum spread before modulating the resulting spread spectrum carrier signal with the user signal. It is to be further understood that PN scrambling means 22 and PN sequence generator 23 are but one spectrum spreading technique that could be used in practicing the present invention. Alternatively, PN scrambling means 22 and PN sequence generator 23 could be replaced by a Frequency-Hopping (FH) code Generator 26 which is used to modulate the light beam of laser source 20 and produce an output light beam wherein the output carrier frequency is hopped in a predetermined sequence. The Frequency-Hopping technique, as a spectrum spreading function, is well known in the art. Regardless of the spectrum spreading techniques used, a (possibly attenuated) replica of the SS-CDMA output signal from a transmitter 13 appears at each output 30 of optical waveguide arrangement 11 along with the SS-CDMA signals from all the other transmitters. An exemplary frequency spectrum of multiple WDM, SS-CDMA, signals, present at each output 30 of optical waveguide arrangement 11 at any point in time, is shown in FIG. 2.

The signals propagating through optical waveguide arrangement 11 are received by each of receivers 14 of transceivers $10_1$ to $10_N$. In a receiver 14, the signal from optical waveguide arrangement 11 is received in a PN descrambling means 31 where the received WDM, SS-CDMA, signal, as shown in FIG. 2, is de-spread using a PN code sequence which is synchronized and matched to the PN code sequence used by a predetermined transmitter 13 of another one of transceivers $10_1$ to $10_N$ forming the two-way communication. The PN code sequence used by PN descrambling means 31 for de-spreading the receiving signal is obtained from PN sequence generator 32 which is under the control of controller 33. The de-spread signal at the output of PN descrambling means 31 can comprise the exemplary configuration shown in FIG. 3, where the desired signal appears as a narrowband signal 39 and the other received transmissions form a smooth low-level background across the spectrum and appear as noise. It must be understood that the desired signal will only appear as a narrowband signal 39 if the PN code sequences used by the associated transmitter and receiver are the same and synchronized in their application to the spreading and de-spreading operation.

Figure 3:
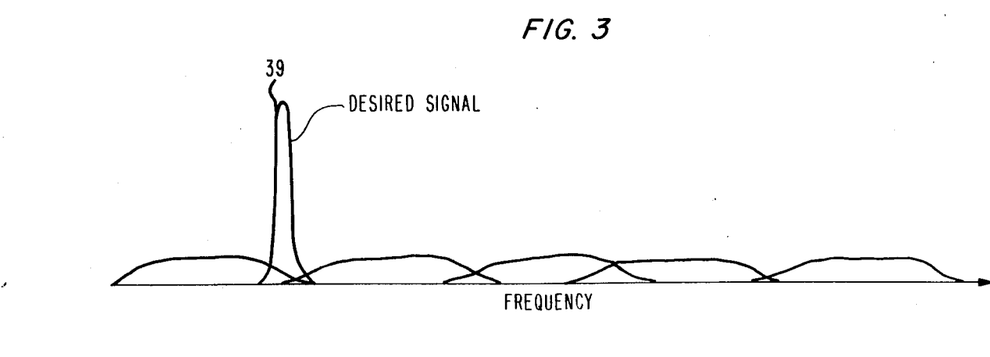
FIG. 3 illustrates the exemplary spectrum of a received signal after de-spreading of the desired signal at a receiver.

The output signal from PN descrambling means 31 is delivered to a narrowband receiver 34 which maintains itself locked to the narrowband signal of FIG. 3 by any suitable technique as, for example, Automatic Frequency Control (AFC), and demodulates the acquired signal to a corresponding analog or digital signal for transmission to the destined user via lead 35. It is to be understood that narrowband receiver 34 can be realized in a variety of ways, such as through the heterodyne or homodyne, detection or through external optical filters.

Where it is desired that the present system also have the capability of communicating with an external network, an optional network interface 12 is connected to optical waveguide arrangement 11 via appropriate coupling means at points 25 and 30 for the coupling of a WDM, SS-CDMA, signal onto optical waveguide arrangement 11 and the reception of WDM, SS-CDMA, signals from the waveguide arrangement, respectively. When present, network interface 12 functions to convert signals between the external network format to that for transmission on optical waveguide arrangement 11 in any suitable manner. For purposes of discussion hereinafter, network interface 12 will not be included in the system description, but it is to be understood that if such interface were present, it would act in a manner similar to that described for any one of transceivers $10_1$ to $10_N$ for providing an appropriate 2-way communication link with the external network.

For the steady state operation, where various transmitters and receivers are already communicating with each other and there is no interest by any transmitter to acquire a 2-way communications link, an exemplary spectrum as shown in FIG. 2 would exist, less the dashed narrowband acquisition signals. Under such steady-state conditions, for each one-way communication link the PN sequence generator 23 in the transmitter at one end of the link and the PN sequence generator 32 in the receiver at the other end of the link must maintain mutual synchronization in order to obtain the narrowband signal 39 in the spectrum shown for the desired signal in FIG. 3. To achieve this, either the PN sequence generator 23 or the PN sequence generator 32 in each transceiver 10 must be "turnable" (i.e., programmable) to permit matching of its PN code sequence to that generated by the other PN sequence generator at the other end of the communciation link. Furthermore, either the laser source 20 of each transceiver 10 or the narrowband receiver 34 of each transceiver 10 must tunable over the full frequency range of interest, in order to allow full network interconnectivity, i.e., any receiver can receive the signal from any transmitter.

A preferred arrangement would be to have each narrowband receiver 34 at each of the transceivers selectively tunable to any frequency within a certain predetermined frequency range, while the laser source 20 of each transceiver $10_i$ is not tunable and generates an arbitrary or undetermined frequency which is not constrained in any way. Indeed, the oscillation frequency of laser source 20 might even drift erratically and fall on top of the frequency generated by the laser source 20 of another transceiver without any adverse effects on the communication links. The range of tunability of each narrowband receiver 34 must be large enough to include all the frequencies of all laser sources 20 present in the system.

It is understood that in the foregoing discussion the term "frequency" refers to the underlying optical carrier and is of the order of 230,000 GHz for a wavelength of 1.3 μm. The usage of frequency as a parameter instead of wavelength is motivated by the particular type of signal processing that makes frequency, and not wavelength, the important parameter. Additionally, in the above-mentioned preferred arrangement, it is also preferable that the PN Sequence Generator 23 at the associated transmitter 13 be programmable to match a PN code sequence generated by the PN Sequence Generator 32 of a desired receiver 14 in another transceiver 10, but that the PN Sequence Generator 32 at the receiver 14 would have to then be capable of synchronization to the PN Sequence Generator 23 at transmitter 13 of the link. It is to be understood that the present system is not limited to such preferred arrangement but that other permutations of the tunability of laser sources 20, narrowband receivers 34, and PN Sequence Generators 23 and 32 could also be used to achieve proper system operation. Controllers 24 and 33 can be used to achieve the proper tunability and synchronization in the associated PN Sequence Generators 23 and 32 and narrowband receiver 34 as will be explained hereinafter.

In a start-up condition, which can occur at any time, a first and a second transceiver are attempting to gain access to each other for establishing a 2-way link between the associated users of the system while others are already communicating via optical waveguide arrangement 11 as described above for the steady state condition. To begin acquisition, one technique would be to hae user "A", associated with, for example transceiver $10_1$ notify its controller 24, via a signaling message, that user "A" wishes to establish a link with user "B" associated with, for example, transceiver $10_N$. Controller 24 can comprise, for example, a simple microcomputer or other device which begins by disabling the PN Sequence Generator 23. As a result, the acquisition signal that user "A" transmits over optical waveguide arrangement 11 is not spectrally spread but, rather, it looks like the narrowband acquisition signals 40 and 41 shown in FIG. 2. This signal does not interfere with already established communication links which are using spread spectrum and, thereby, are immune to narrowband interference.

Laser source 20 at transceiver $10_1$ is modulated by an introductory message from user "A", which introductory message can comprise certain preamble information including the address of the calling transceiver ($10_1$) and the address of the called transceiver ($10_N$). The modulated narrowband introductory signal is sent over optical waveguide arrangement 11 as a narrowband acquisition information signal centered on the carrier frequency generated by laser source 20 of transceiver $10_1$. This narrowband acquisition information signal from transmitter 13 of transceiver $10_1$ appears as, for example, the narrowband signal 40 in FIG. 2 when looking at the overall frequency spectrum of optical waveguide arrangement 11. Such narrowband acquisition signal is only transmitted by the calling transceiver during acquisition, which, generally, takes a small amount of time when compared to the time the communication link is maintained after acquisition has been completed.

Each of the receivers 14 of transceivers $10_1$ to $10_N$ receives the narrowband introductory message 40 from transceiver $10_1$ along with all other 2-way communications propagating on optical waveguide arrangement 11 from the already established communication links. If the called transceiver $10_N$ is not already busy on another communication link, then under the control of its controller 33 of receiver 14, its narrowband receiver 34 is caused to continuously scan the frequency spectrum in order to detect a narrowband acquisition information signal similar to signal 40 of FIG. 2 somewhere in the spectrum of optical waveguide arrangement 11. When an exemplary signal 40 is received, controller 33 detects, via its feedback path 36, that such narrowband signal exists and causes narrowband receiver 34 to lock onto the carrier frequency of the narrowband signal to permit decoding the message contained therein. If the address contained in the decoded acquisition information message corresponds to another transceiver, then this transceiver will unlock its narrowband receiver 34 and resume scanning the spectrum, repeating the above process until it obtains an acquisition information message indicating that this is the transceiver being called.

After locking onto an acquisition information signal and finding that the decoded acquisition information message indicates that the transceiver is being called, controller 33 of the called transceiver $10_N$ notifies the associated controller 24 in transmitter 13 that the transceiver is being called by transceiver $10_1$. Such notification causes controller 24 to disable PN Sequence Generator 23 while sending a proper acquisition answer message to the light modulating means 21, which includes the addresses of the called and calling transceiver. Such action causes transmitter 13 of transceiver $10_N$ to transmit a narrowband acquisition answer signal, using the arbitrary or undetermined carrier frequency generated by its laser source 20, onto optical waveguide arrangement 11. Such narrowband acquisition answer signal can take the exemplary form of signal 41 in FIG. 2, which is, in general, at a frequency different from that of signal 40.

While transceiver $10_1$ is transmitting its narrowband acquisition information signal indicating it wishes to establish a 2-way call with transceiver $10_N$, controller 33 of transceiver $10_1$ is causing its narrowband receiver 34 to scan the spectrum looking for a narrowband signal such as signal 41 in FIG. 2. When it detects a narrowband signal, it causes narrowband receiver 34 to lock onto the carrier of such narrowband signal and decodes the message therein to see if it is an answer signal from transceiver $10_N$. If the detected narrowband signal is other than an answer signal from transceiver $10_N$, then controller 33 of transceiver $10_1$ unlocks its narrowband receiver 34 to continue the scanning and detection process.

Once transceiver $10_1$ detects that the received narrowband signal is an answer signal from transceiver $10_N$, a 2-way link is established since transceiver $10_1$ is locked onto the carrier frequency of the laser source 20 of transceiver $10_N$, and vice versa, due to the two acquisition information signals. The next and final step consists of switching to spread-spectrum communication on the newly achieved two-way link by activating PN scramblers 22 and descramblers 31 at both ends of the link. The final step begins with the controllers at the two ends of the link exchanging information about the PN sequence to be used for scrambling. For example, each transmitter could send to the receiver 14 at the other end the exact PN bit sequence to be used for descrambling. Alternatively, a short identifier or seed for generating the sequence could be sent. Such technique would allow the use of very long PN sequences without requiring the controllers to maintain a large directory of PN sequences in use in the system.

Next, the two transceivers must switch on their PN scramblers 22 and descramblers 31, and achieve pairwise synchronization of the associated PN code sequences. As soon as PN scramblers 22 are activated, the two narrowband acquisition signals 40 and 41, shown dashed in FIG. 2, disappear from optical waveguide arrangement 11 and are replaced by their spread-spectrum counterparts which look like the other signals already present on the waveguide arrangement 11, shown solid in FIG. 2. When proper synchronization of the PN sequence is achieved, the condition will be characterized by the appearance of narrowband signal 39 in the spectrum after PN descrambler 31, as shown in FIG. 3. The two transceivers can coordinate the transition to PN scrambling and descrambling through the already-established two-way link, so that the PN sequences will be approximately synchronized when the transition takes place. Final adjustment of the synchronization can then be achieved quickly through a simple search procedure. For example, controller 33 directs PN sequence generator 32 to slowly advance or retard the position of the generated PN code until narrow signal 39 appears in the spectrum, indicating that proper synchronization has been achieved. The two-way link is now operating in the steady-state WDM, SS-CDMA transmission format.

If, however, transceiver $10_{10}$ is presently busy on a call, it will not be sweeping or scanning the frequency spectrum looking for an acquisition information signal, but will be locked onto an existing WDM, SS-CDMA signal forming a current 2-way communication. As a result no answer will be sent by transceiver $10_N$ back to transceiver $10_1$ within a reasonable period of time, and user 1 is thereby notified that his call cannot presently be completed.

It is to be understood that the above described technique for acquiring a 2-way link is merely provided for exemplary purposes and not for purposes of limitation since other techniques can also be used. For example, if transceiver $10_1$ wishes to establish a 2-way link with transceiver $10_N$ transceiver $10_1$ can generate an acquisition information signal which is encoded with the (perhaps abbreviated) PN code sequence used by transceiver $10_N$, rather than being a narrowband uncoded signal. The PN code sequence of transceiver $10_N$ can be easily determined from a look-up table in an associated memory of controller 24 of transceiver $10_1$. Meanwhile, each receiver 14 of all non-busy transceivers is sweeping or scanning the spectrum while changing the phase of its PN code sequence for each sweep of the spectrum by, for example, skipping one symbol. Within a short time, the PN Sequence Generator 32 at receiver 14 of transceiver $10_N$ will detect a narrowband signal 39 as shown in FIG. 3, because the PN Sequence Generator 32 at transceiver $10_N$ will become synchronized with the PN Sequence Generator 23 in transmitter 13 of transceiver $10_1$ when the phase of the received PN code sequence matches the generated PN code sequence at PN descrambling means 31 of transceiver $10_N$. At this point transceiver $10_N$ is locked onto the frequency and is synchronized with the PN code sequence transmitted by transceiver $10_1$. At such occurrence, transceiver $10_N$ transmits an acquisition answer signal, which is also WDM, SS-CDMA, encoded, back to transceiver $10_1$ where a similar process is repeated in transceiver $10_1$ until both transceivers are frequency and PN code sequence locked. Then 2-way steady state communications can proceed.

Availability of timing could be an expeditious feature to provide. Otherwise, acquisition is twodimensional (frequency and timing). Special signals marking the edges of the timing band could also be used to refresh bit and chip timing at the start of each frequency sweep. Thus the timing acquisition problem is mitigated so long as the hardware is kept stable enough to maintain timing during each sweep.

Figure 4:
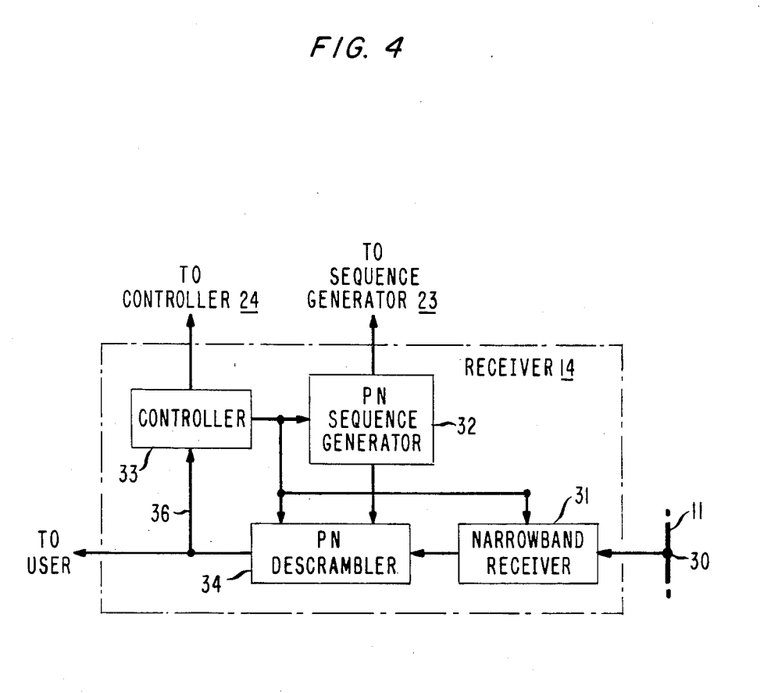
FIG. 4 is an alternative arrangement of the receiver of FIG. 1.

It is to be understood that the above-described embodiments are simply illustrative of the principles of the invention. Various other modifications and changes may be made by those skilled in the art which will embody the principles of the invention and fall within the spirit and scope thereof. For example, as shown in FIG. 4, the receiver 14 can comprise the structure wherein the signal from output 30 of waveguide arrangement 11 is received in the narrowband receiver 31 where the received lightwave signal is converted into an electrical signal which is then de-scrambled in PN de-scrambler 34 using the PN sequence generated by PN sequence generator 32. Additionally, in transmitter 13, light modulator 21 and PN scrambling means can be interchanged or any one or both parts may be incorporated as part of laser source 20.

What is claimed is:

1. An optical transmitter comprising:
   an input terminal receiving either one of an analog or digital signal from a user associated with the optical transmitter;
   an output terminal for connection to a lightwave waveguide arrangement of an optical communication system;
   a single frequency laser source (20) for generating a lightwave carrier signal at an undetermined wavelength;
   means (21) for modulating the lightwave carrier signal from the laser source with the analog or digital signal received at the input terminal to generate a lightwave signal with a narrowband optical spectrum; and
   means (22, 23) for spreading the optical spectrum of a lightwave signal using a predetermined, reiterative encoding sequence such that a lightwave output signal at the output terminal of the optical transmitter has an optical spectrum which is wider than the spectrum that the lightwave signal would have in the absence of the spreading means.

2. An optical transmitter according to claim 1 wherein the spectrum spreading means comprises:
   a pseudo noise (PN) sequence generator for selectively generating a reiterative PN encoding sequence; and
   PN scrambling means coupled between the laser source and the output terminal of the optical transmitter for scrambling a lightwave signal generated in the laser source with the reiterative PN encoding sequence from the PN sequence generator.

3. An optical transmitter according to claim 2 wherein
   the modulating means forms a part of the laser source for directly producing a lightwave signal at the output of the laser source which is modulated with the analog or digital signal received at the input terminal.

4. An optical transmitter according to claim 2 wherein
   the modulating means forms a part of the PN scrambling means for producing a lightwave signal that is both modulated with the analog or digital signal received at the input terminal and scrambled with the reiterative PN sequence from the PN sequence generator.

5. An optical transmitter according to claim 1 wherein the spectrum spreading means comprises:
   a pseudo noise (PN) sequence generator for selectively generating a predetermined reiterative PN encoding sequence; and
   the laser source includes the modulating means and spectrum-spreading means and is responsive to both the output signal from the PN sequence generator and the signal from the input terminal for producing a lightwave signal that is both modulated with the signal from the input terminal and scrambled with the predetermined PN sequence from the PN sequence generator such that the shape of the electromagnetic spectrum of the lightwave signal generated by the laser source is determined primarily by the combination of the input signal and the PN sequence and is not significantly affected by the operational parameters of the laser source.

6. An optical transmitter according to claim 1 or 2 wherein:
   the spectrum spreading means is capable of selectively using any one of a plurality of encoding sequences at any instant of time for scrambling the lightwave signal.

7. An optical transmitter according to claim 1, 2 or 5 wherein the optical transmitter further comprises:
   a controller, responsive to a control signal from the associated user indicating a request to initiate a connection with a selected remote receiver, for (1) determining the appropriate reiterative encoding sequence to be used to communicate with the selected remote receiver, (2) enabling the laser source and the spectrum spreading means to generate the lightwave signal at the undetermined frequency and the appropriate reiterative encoding sequence, respectively, and (3) generating an acquisition information message including the identity of both the present transmitter and the selected remote receiver for transmission to the light modulating means for modulating the lightwave signal of the laser source.

8. An optical receiver comprising:
   an input terminal for receiving a plurality of differently encoded spread-spectrum, code-division-multiple-access (SS-CDMA) lightwave signals which are wavelength-division-multiplexed (WDM) in a random manner over the (frequency) optical spectrum of a lightwave waveguide arrangement;
   means (31, 32) for de-spreading the optical spectrum of a WDM, SS-CDMA lightwave signal received at the input terminal using a reiterative decoding sequence and generating an output signal representative of such de-spread lightwave signal; and
   narrowband receiving means (33, 34) responsive to the output signal from the de-spreading means for (1) detecting a narrowband signal embedded within the other lightwave signals, and (2) locking onto the detected narrowband signal, associated with one of the received SS-CDMA signals, and maintaining such lock for a selective period of time.

9. An optical receiver according to claim 8 wherein the narrowband receiving means comprises:
   a narrowband receiver for receiving the output signal from the de-spreading means and for demodulating the output signal for transmission to an associated user of the receiver; and a controller for (1) selectively changing the phase of the reiterative decoding sequence used by the de-spreading means, (2) monitoring the output signal from the narrowband receiver to detect the occurrence of a narrowband signal, and (3) upon detection of a narrowband signal, stopping the selective changing of the phase of the predetermined reiterative decoding sequence and causing the narrowband receiver and de-spreading means to lock onto the detected narrowband signal.

10. An optical receiver according to claim 8 or 9 wherein the de-spreading means comprises:
  a pseudo noise (PN) sequence generator for selectively generating a reiterative PN decoding sequence; and
  PN descrambling means for decoding the received WDM, SS-CDMA, lightwave signal received at the input terminal with the predetermined reiterative PN decoding sequence generated by the PN sequence generator.

11. A method of transmitting a plurality of lightwave signals over a lightwave waveguide arrangement, the method comprising the steps of:
  at each of a plurality of lightwave transmitters,
  (a) generating a lightwave carrier at an undetermined wavelength;
  (b) modulating the lightwave carrier signal from step (a) with a separate analog or digital information signal to be transmitted from a separate user, to generate a lightwave signal with a narrowband optical spectrum;
  (c) spreading the optical spectrum of either one of (1) the lightwave carrier signal prior to performing step (b), or (2) the narrowband lightwave signal obtained from step (b) using a reiterative encoding sequence which is different from a reiterative encoding sequence used for spreading the optical spectrum of lightwave signals at other transmitters; and
  (d) coupling the modulated and spreadspectrum signal obtained from step (c) onto the lightwave waveguide arrangement for forming, with other lightwave signals obtained from the other transmitters, a wavelength-division-multiplexed, spread-spectrum code-division-multiple-access (WDM, SS-CDMA) lightwave signal which propagates along the lightwave waveguide arrangement.

12. A method of transmitting a plurality of lightwave signals according to claim 11, the method comprising the further step of:
  (e) in performing step (c), spreading the optical spectrum of the lightwave signal or the modulated lightwave signal by further modulating its amplitude and/or phase with a reiterative pseudo-noise (PN) encoding sequence.

13. A method of transmitting a plurality of lightwave signals according to claim 11, the method comprising the further step of:
  (e) in performing step (c), spreading the optical spectrum of the lightwave signal or the modulated lightwave signal with a reiterative frequency-hopping (FH) encoding sequence.

14. A method of transmitting a plurality of lightwave signals according to claim 11, the method comprising the further steps of:
  at a first transceiver wanting to establish a 2-way link over the lightwave waveguide arrangement with a given one of a plurality of second transceivers,
  (e) performing steps (b) and (d) using an analog or digital unspread acquisition signal including the identity of the first and the given one of the second transceivers; and
  at each receiver associated with the first and the plurality of second transceivers not already busy on a 2-way link,
  (f) scanning the optical spectrum of the signal obtained from the lightwave waveguide arrangement for detecting a narrowband lightwave signal;
  (g) in response to a detection of a narrowband lightwave signal in step (f), locking onto the detected narrowband lightwave signal to establish a link from the first transceiver to the predetermined one of the plurality of second transceivers for a selective period of time.

15. A method of transmitting a plurality of lightwave signals over a lightwave guiding means according to claim 14, the method comprising the further steps of:
  (h) at a transmitter of the predetermined one of the plurality of second transceivers wherein the associated receiver has detected the narrowband lightwave signal according to step (f),
  (i) performing steps (b) and (d) for transmitting an unspread acquisition signal back to the first transceiver; and
  at a receiver of the first transceiver,
  (j) performing steps (f) and (g) for establishing the link from the prdetermined one of the plurality of second transceivers to the first transceiver to complete a two-way link between the transceivers.

* * * * *

UNITED STATES PATENT AND TRADEMARK OFFICE
CERTIFICATE OF CORRECTION

PATENT NO. : 4,703,474

DATED : October 27, 1987

INVENTOR(S) : Gerard J. Foschini and Giovanni Vannucci

It is certified that error appears in the above-identified patent and that said Letters Patent is hereby corrected as shown below:

Claim 8, line 49, after "the" remove --(frequency)--.

Signed and Sealed this

Fourteenth Day of June, 1988

Attest:

DONALD J. QUIGG

Attesting Officer

Commissioner of Patents and Trademarks